United States Patent [19]

Finkel et al.

[11] Patent Number: 4,739,637

[45] Date of Patent: Apr. 26, 1988

[54] LOCKING DEVICE FOR PORTABLE EQUIPMENT

[75] Inventors: A. Milton Finkel, N. Hollywood; Stephan F. Bunka, Tarzana, both of Calif.

[73] Assignee: Vaultec Industries, Inc., Tarzana, Calif.

[21] Appl. No.: 609,828

[22] Filed: May 14, 1984

[51] Int. Cl.[4] .......... E05B 63/00; E05B 73/00; F16M 1/00

[52] U.S. Cl. .......... 70/58; 248/553

[58] Field of Search .......... 70/58; 52/292; 248/551, 248/552, 553; 109/50

[56] References Cited

U.S. PATENT DOCUMENTS

| | | | |
|---|---|---|---|
| 2,486,032 | 10/1949 | Jiminez | 248/552 |
| 2,928,199 | 3/1960 | Novak | 70/58 |
| 3,434,312 | 3/1969 | Buchman | 70/58 |
| 3,724,798 | 4/1973 | Lucasey | 248/553 |
| 3,771,338 | 11/1973 | Raskin | 70/58 |
| 3,801,055 | 4/1974 | Stenger | 248/551 |
| 3,850,392 | 11/1974 | Gassaway | 248/553 |
| 4,018,339 | 4/1977 | Pritz | 248/553 |
| 4,022,036 | 5/1977 | Cebuhar | 248/553 |
| 4,029,370 | 6/1977 | Ziegel et al. | 248/553 |
| 4,063,646 | 12/1977 | Stahl | 248/552 |
| 4,065,083 | 12/1977 | Gassaway | 248/551 |
| 4,082,387 | 4/1978 | Davis | 248/553 |
| 4,261,122 | 4/1981 | Le Vine | 248/551 |
| 4,325,531 | 4/1982 | Omholt | 248/553 |
| 4,724,798 | 2/1988 | Lucasey | 70/58 |

*Primary Examiner*—Gary L. Smith
*Assistant Examiner*—Vinh Luong
*Attorney, Agent, or Firm*—Frank L. Zugelter

[57] ABSTRACT

This manufacture prevents an unauthorized removal of an article or equipment item, such as a typewriter, for example, from a table top or the like. The article is secured to a cover plate which includes a plurality of hooking members or ears on its underside. These hooking members in turn engage apertures the body formations for which are securely mounted to a flat plate that in turn is secured to the table top or mounting surface. To assemble cover and plate into a locked position, the cover and its ears are shifted in a direction for engagement of ears to apertures. In this position then, a tang on a cylinder lock mounted in the cover's periphery is rotated into abutment with an edge of the plate, and the lock locked. The cover can no longer shift in a reverse direction to disengage ears from apertures. Case-hardened sleeves are provided to prevent sawing of screws which secure cover and article together. A body segment along the abutting edge of the plate is provided, defined by at least one recess, to cause a jamming effect in the event a prying bar were used adjacent the lock cylinder in an effort to separate cover and plate. Encompassment of cover to plate prevents successful attack to break engaged ears and apertures.

29 Claims, 2 Drawing Sheets

LOCKING DEVICE FOR PORTABLE EQUIPMENT

TECHNICAL FIELD

This invention relates to apparatus which fasten equipment to mounting surfaces such as table tops, desk tops, or the like, and more particularly, to an apparatus which secures equipment in place, thereby preventing an unauthorized removal.

BACKGROUND ART

Disclosures of prior art teachings which are in the nature of this type of a security or anti-theft apparatus will be found in U.S. Pat. Nos.: 2,486,032; 2,764,817; 3,128,979; 3,464,241; 3,605,460; 3,616,096; 3,637,181; 3,664,616; 3,724,798; and 3,850,392.

DISCLOSURE OF THE INVENTION

The subject matter of the invention comprises an assembly of a cover and a plate, each of them cooperatively assembled to the other so that, after the plate has been securely mounted to a mounting surface, such as a table or desk top, and the cover has been securely mounted to the bottom of an article or equipment item to be safe-guarded against an unauthorized removal, the cover, plate and their elements interact with one another in their assembly to produce a secured arrangement for the surface-mounted article which can not be separated after the assembled cover and plate are locked together in one position.

In more particularity, the cover and plate include a plurality of keying members which engage one another in assembly, as the cover and plate shift relative to each other, such engagement not being accessible from outside of the apparatus. The members on the plate preferably take the form of apertured clips, while the members on the cover preferably take the form of one or more ears which hook in their shifting motion into corresponding one or more apertures of the clips. The cover is secured to an article, after which it encompasses the plate and its ears are slidingly moved relative to the plate previously secured to the table top, so that the ears enter and project through such apertures, to thereby position the cover in an attached relationship to the plate. After such sliding motion to obtain such position of attachment within the confines of the cover and plate, cover and plate are locked in such position to one another. A locking element mounted to the cover includes a tang which rotates by operation of a hand key. It is only after ears and apertures are engaged that the tang can be rotated, into abutment against the plate or one of its edges. This abutment prevents the keying members from being reversibly withdrawn from one another which, of course, would provide freedom of disassembly. The feature of the keying members is advantageously embellished by arbitrary and secretive selection of locations for one or more sets of cooperating or keyed ears and apertures. For example, for a particular cover and plate [identified, for example, by a serial number], one or more keying members are mounted to the underside of a given-sized cover, with a corresponding one or more keying means mounted to the topside of a plate sized to such cover and at a location on the plate to cooperate with the one or more keying members depending from the cover. The pattern for location of such sets is determined at the factory for each manufacture, and only its purchaser will have knowledge of such pattern at the time of purchase. Thus, even through standardization in a size or sizes of each manufacture is useful in the production and utilization of the invention, it does not detract from unique, distinct, original and secret patterns that can be established for the purchaser at the time of order of a manufacturer or apparatus embodying the invention. An innumerable number of secret patterns is available in carrying out the invention and its concept.

The invention further includes a jamming feature which is activated in the event an attempt to disassemble or separate a locked cover-and-plate assembly s made. A body segment defined by two spaced recesses is provided into and along the edge of the plate, and a tab is mounted on the end of the tang. One of these recesses also is utilized to provide access to a location under the plate or its body segment for such tab as the tang rotates into abutment with such edge. Were the cover's sidewall pryed below the tang and its tab, or elsewhere, in an effort to move the cover up to eliminate abutment of tang to plate edge, in no way is the body segment removed from the side of the tang, as the tab keeps the edge of the body segment in its abutting relationship to the tang. Were the plate in some way caused to be bent, the body segment remains unaffected. Consequently, in either situation, the cover and plate do not slide sufficiently to disengage ears and apertures.

Further, in some prior art devices of this type, a hacksaw or the like could saw through screws securing the top of the cover to the bottom of the equipment item. The hacksaw blade could be inserted between these elements, to saw through such screws and thereby free the item from its security apparatus. This invention includes the feature of case-hardened sleeves mounted about these screws, between the cover and the bottom of the item. A finger tightening of the screws only is necessary to provide a snug fit for these sleeves, to prevent a hacksaw blade from being applied. Were its blade applied to one of the sleeves, it simply would rotate about its screw, not biting into the sleeve.

Other advantages heretofore not incorporated in prior devices are found in this invention. For example, no special installing tool is required, but only an ordinary screw-driver and electric drill. The manufacture is portable. It can be utilized at one work station and transferred to another as desired, to either be utilized on the same or different type of equipment. Prior devices include greater numbers of separate elements and/or special tools and procedures required for installation, assembly and disassembly. And servicing of this invention, which requires but disassembly of cover and plate, achieves an ease of service heretofore not taught in the art.

A unique advantage of this invention is a non-engagement feature between the bottom edge of a periphery on the cover and the mounting surface. The essence of this feature is that the depth of the periphery from the topwall of the cover need extend only to at least substantially the plane of the top of the rigid plate, and not to the plane of the mounting surface. For example, were the rigid plate set on either the mounting surface, or set on a pad physically engaging the mounting surface, the periphery's depth need only extend to the plane of the plate's top. The planes of the plate's top and that of the mounting surface are, of course, not superimposed upon one another, true in either case of either use with or without pad. The periphery's depth nevertheless is sufficient in either case. And further, with use of a pad, the invention's scope is increased, whether the pad exhibits specific adhesive qualities or not, i. e., in terms of tension, shear or peelability characteristics (difficulty or ease of removal in various ways of a pad from what it adheres to). That is, the pad may be merely a cushioning or sound absorbing element or one having adhesive qualities on each of its mounting sides. Where adhesive qualities are included in a pad that is used, it matters not what the degree (high or low) of forces of tension, shear or peelability characteristics is, or the relative comparisons of these forces one with another. In any use of the invention, with or without a pad, access to the keying members which are disposed between the cover and rigid plate nevertheless remains inaccessible because of the rigidity and extent of the plate and its relationship to the cover in their assembly, and by which the assembled manufacture cannot be severed for the purpose of taking the equipment or article from its position on the mounting surface. And, of course, the manufacture of a cover whose periphery's depth extends to or beyond the plane of the bottom of the rigid plate is comprehended within the scope of the invention and may be feasibly considered for purposes of manufacturing device 10.

An object of this invention is to provide a novel and improved manufacture or apparatus for securing an article or equipment item to a mounting surface.

A further object is to provide a relatively lightweight, and easily—and—readily installable manufacture.

Another object is to prevent theft of an article by utilization of the invention.

Another object is to provide installation and removability from only one side of the mounting surface to which the plate is secured.

A still further object is to make inaccessable elements by which the manufacture is operatively assembled so that it can not be disassembled without a lock means first being disabled.

A further object is to provide a tamper-proof, pry-proof manufacture.

Another object is to provide a securing manufacture which can be utilized with a variety of different types of equipment items or articles, with or without a locking mode.

A further object is to provide a randomly-selected pattern for the means engaging plate and cover, the owner of such apparatus being able to selectively choose a particular pattern known only to himself, with such pattern being inaccessible to the eye in the operation of the invention. In this manner then, a thief can not rely on any kind or degree of "standardization" that may be utilized in the manufacture of the invention.

A further object is to provide an anti-theft security apparatus reliable in operation.

It is another object to provide the locking of an article to a mounting surface.

A further object is to provide sufficient flexibility for movement of an article from one location to another.

Another important object of this invention is to provide ease of removal for servicing, of the article or piece of equipment being protected, not heretofore provided in the art.

A further object of the invention is to provide portability in the device itself and in the combination of the device and an article secured to it.

These and other objects and advantages will become more apparent on a complete and full reading of the following description, the appended claims thereto, and the drawing comprising two sheets accompanying this specification.

BEST MODE(S) FOR CARRYING OUT THE INVENTION

Figures 1, 3, 4, 5, 6:
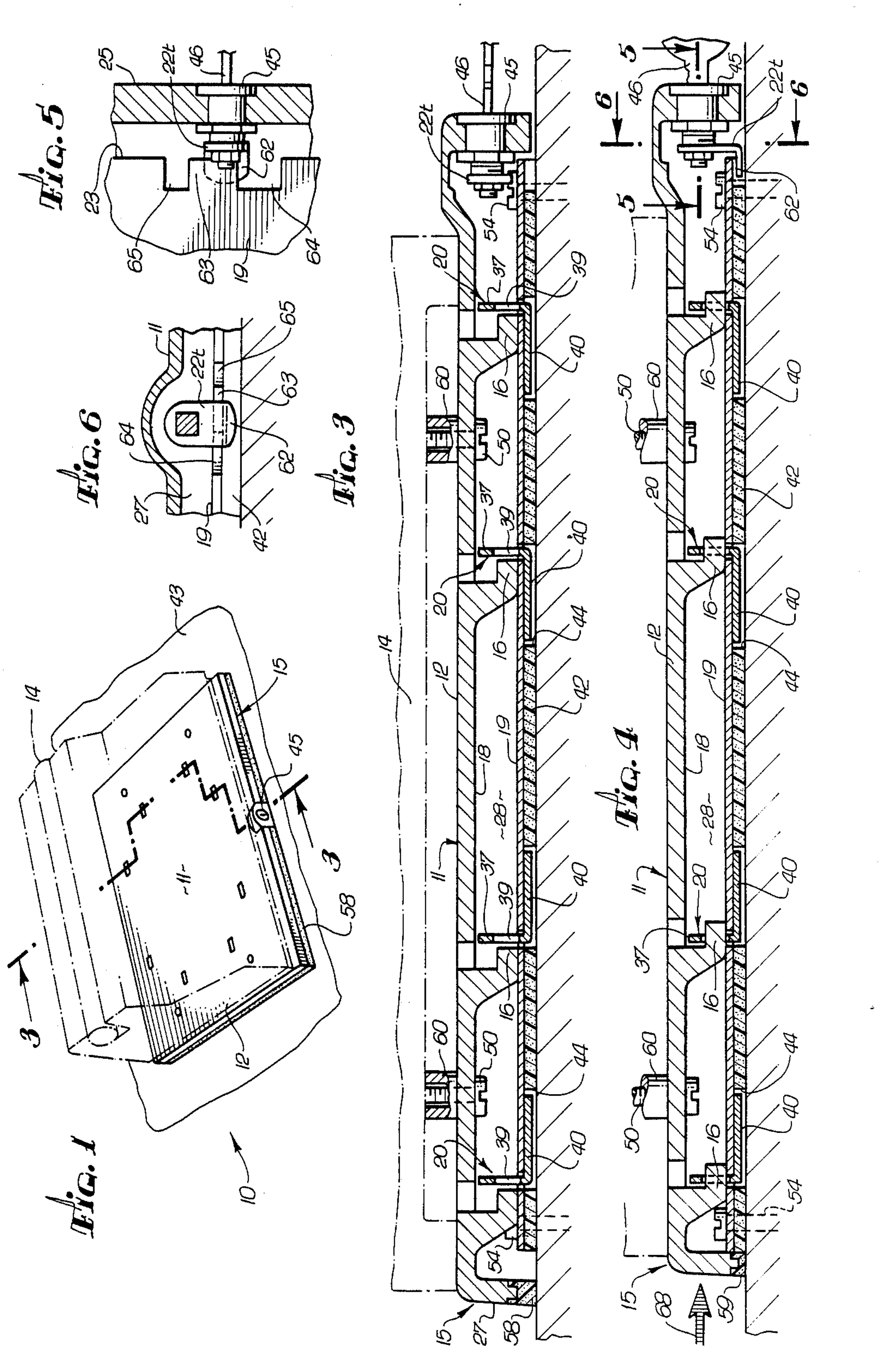
FIG. 1 is a perspective view of an embodiment of the invention, as applied to an article (typewriter example shown in phantom) which is securely thereby to a mounting surface.
FIG. 3 is a view taken on line 3—3 of FIG. 1.
FIG. 4 is a view similar to FIG. 3, however, showing the engaged or assembled relationship of elements of the disclosed embodiment which itself is slightly modified over FIG. 3.
FIG. 5 is a view taken on line 5—5 of FIG. 4, but modified.
FIG. 6 is a view taken on line 6—6 of FIG. 4, but modified.

Referring now to the drawing wherein reference characters correspond to like numerals hereinafter, reference character 10, FIG. 1, denotes a manufacture embodying the present invention. Manufacture 10 generally comprises a cover 11 having a topwall 12, FIGS. 1, 3, 4, for mounting thereon an article 14, for example, a typewriter 14, a periphery 15 integrally formed with its top wall 12, one or a plurality of keying members 16 securely mounted and depending from the underside 18 of topwall 11 12, a single plate 19 encompassed by periphery 15 and topwall 12 of cover 11, a plurality of means 20 mounted on plate 19 and with which members 16 key, FIGS. 2, 3, 4, and a lock means, such as a tang **22*t*, FIGS. 3, 4, suitably mounted to periphery 15 of cover 11 for abutment with plate 19 in a locked position for the assembly of manufacture 10**.

In more particularity, cover member 11 is preferably rectangularly configured and preferably includes a plurality of members or ears 16 (over just one of such members) each of which depends vertically or downwardly from the underside 18 of topwall 12. Each ear 16 then extends in a direction towards an edge 23 of plate 19, and towards tang **22*t*in this embodiment, being spaced from underside 18 sufficiently to key with a corresponding one of means 20 as relative or horizontal shifting motion occurs between cover 11 and plate 19. Each ear 16 is spaced one from another throughout the expanse of cover 11, and any desired number, one or more, and placements or locations of such one or more members on cover member 11** can be utilized.

Figure 2:
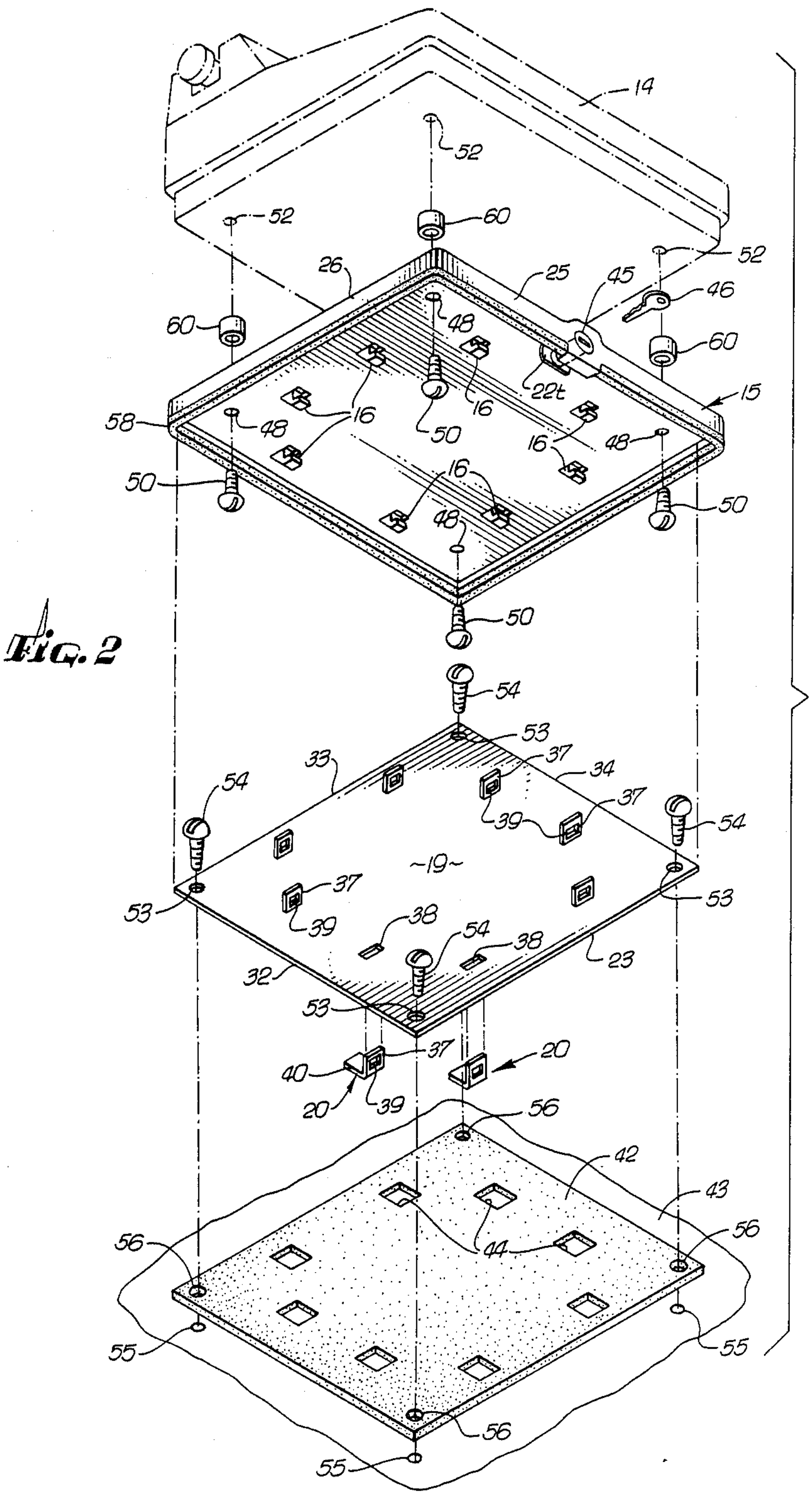
FIG. 2 is an exploded perspective view of the embodiment of the invention shown and as applied to the article in FIG. 1.

Plate 19, FIG. 2, comprises a flat, relatively thin, non-flexible or rigid single member, i.e. of no more than of a one-piece construction, preferably of metal fabrication. It conforms to the general configuration of periphery 15, i.e., substantially co-extensive in area to cover member 11, however, smaller in areal dimensions so that periphery 15 of cover 11 encompasses it. In this embodiment, rectangular side walls 25, 26, 27, and 28 constitute periphery 15 of cover 11, while plate 19 correspondingly includes rectangular edges 23, 32, 33, and 34. Rectangular edges 23 lies in physical proximity to tang **22*t***for cooperative action therewith in the locking of plate and cover together, in assembly, as will be more fully described hereinafter.

Each of means 20 is securely mounted to plate 19 and comprises, in this embodiment, an L-shaped clip member, on leg 37 of which projecting through its corresponding slot 38, FIG. 2, provided in plate 19. Each leg 37 projects upwardly from plate 19, and includes an aperture 39, while its other leg 40, FIGS. 2, 3, 4, is suitably fastened to the underside of plate 19. Each leg 40 may extend in either horizontal direction from its associated slot 38 in plate 19, as seen in FIGS. 3, 4.

A cushioning, sound-absorbing, and/or adhesive pad 42, FIG. 2, such as made of felt, cork, rubber, or even of a polyurethane foam mounted with adhesive on both of its sides (example of which being NORMOUNT V1200, available from Norton Performance Plastics, 1 Sealant Park, Granville, N.Y. 12832), may be utilized between plate 19 and a mounting surface 43, with a number of openings 44 in it to accomodate a like or greater number of legs 40 of means 20. Pad 42 is suitably affixed to the bottom of plate 19, or to mounting surface 43, or used as a separate piece in assembly, as desired.

Lock means, here, tang 22*t*, is mounted on and interiorly of the cover's periphery 15; here, on side wall 25. Side wall 25 faces the direction of horizontal lateral extension for keying members 16 depending from cover 11. Tang 22*t*is included in a conventional cylinder lock 45 which in its usual operation, by means of a finger key 46, rotates or turns tang 22*t*between two positions, one of which provides abutment to edge 23 on plate 19 after the latter's assembly and completed shifting motion with respect to cover 11. Lock 45 is securely mounted in sidewall 25 in known fashion.

Suitably-sized apertures 48, FIG. 2, are included in cover 11 as a means by which cover 11 is adaptable for secure mounting to article 14. Headed screws 50, or the like, are thrust through apertures 48 to cooperate with threaded holes 52 conventionally provided in the bottom of article 14.

Suitably-sized apertures 53, FIG. 2, with or without pad 42, or pad 42 itself, is included in plate 19 as a means, by which it is adaptable for secure mounting to mounting surface 43. Headed screws 54, or the like, are thrust through apertures 53 to cooperate with threaded holes 55 conventionally provided in mounting surface 43. pad 42 may include corresponding holes 56 to accomodate screws 54.

It is to be noted in FIG. 3 that periphery 15 includes a depth which extends to the plane of the top of rigid plate 19, when engagement of ears 16 to aperture 39 exists. Whereas, FIG. 4 shows the depth of periphery 15 to extend below the plane of the bottom of plate 19. Or, such depth can be in plane with the bottom of plate 19. Or, such depth may extend to any plane between the indicated extremes. The lineal open dimension or gap between the bottom of periphery 15 and mounting surface 43 and the spacings between the plate's boundaries and periphery 15, in the encompassing of cover to plate, is such that no hacksaw or the like can be inserted under a periphery 15 and to above plate 19 to attack an ear 16 or leg 37 of a clip-like member keyed to the ear. In practical terms, such gap should never exceed the thickness merely of rigid plate 19, and the dimensional spacings between the plate's boundaries and the periphery should be small. Periphery 15 may be reduced in its thickness to accomodate a U-shaped molded rubber element 58, 59, FIGS. 3, 4, respectively, and which prevents marring or damage of mounting surface 43 as cover and plate are assembled together in an actual manufacture of the invention. Also, in any manufacture of the invention, dimensional control for the interlocking or engagement of ears 16 and apertures 39 always is necessary for proper mechanical interfacing of cover and plate.

Additional security features are included in a modification to the above described embodiment. In FIGS. 2, 3, and 4, a casehardened sleeve 60 is mounted about each screw 50, between top 12 of cover 11 and the bottom of article 14. Screws 50 are fingered-tightened so that sleeves 60 are snugly fit between cover and article, whereby a sawing means cannot separate cover and article. Were an effort made to apply a hacksaw to a sleeve 60, it would roll about its screw 50 and prevent the saw from obtaining a grip on it.

In FIGS. 5, 6, a tab 62 is integrally formed or otherwise suitably secured to, and at a right angle to, tang 22*t*. A body segment 63 is generated along edge 23 of plate 19 by means of a spacing recess 64. Segment 63 generally overlies tab 62 in the latter's position shown in FIG. 5, it being noted that recess 64 is superimposed on the arch through which tab 62 must advance to its position shown in FIG. 5. In this embodiment, lock cylinder 45 controls the rotation of tang 22*t*and tab 62 as they respectively rotate into abutting and underlying relationships to edge 23. A second recess 65 can be provided along edge 23, spaced from recess 64, in order to weaken segment 63 so that it bends more easily for jamming purposes. With tab 62 situated beneath edge 23 of plate 19 in the lock mode for tang 22*t*, manufacture 10 is in an assembled locked condition (with hand key 46 removed from lock cylinder 45). Were an effort to use a crowbar or the like to raise cover 11 from plate 19 at a location adjacent the lock cylinder, it will be seen that tab 62 maintains body segment 63 against the side of tang 22*t*. Were an effort made to depress plate 19 below the level of tab 62, body segment 63 remains in abutting relationship to tang 22*t*. In either case, jamming occurs so that no successful effort to break apart the locked assembly of cover and plate is produced.

Any number of keyed sets of element 16, 20 is adaptable to the invention, in terms of location on their respective elements, cover 11 and plate 19. The pattern for such location or locations in a given embodiment of the invention can be defined as a randomly-selected pattern. With but one keyed set, elements 16, 20 can be mounted at any location and in any orientation to plate and cover as long as elements 16,20 key to or cooperate with one another in a fore-and-aft motion to produce a position in assembly for locking a tang 22*t*against plate 19. A plurality of keyed sets of elements 16, 20, can be mounted in columnar and/or row fashion, at one or more arbitrarily-chosen locations including, if desired, omission of one or more keyed sets at any particular location or locations in a column and or row. An omission of a keyed set is defined as either no cooperating elements 16, 20 at a location or one of such elements 16 or 20 is lacking so that no keying or latching can occur at that location. Staggered locations are also feasible, i.e., non-equal spacing one from another, in column, row or otherwise. And any combination of columnar, row and staggered schemes also can be utilized. In fact, no geometrical parameter is required to be followed.

This concept of a randomly-selected pattern is adaptable in a circular scheme as well. For example, a plurality of geometrical concentric circles within the areal expanses of cover and plate, and against which specific locations or omissions of locations for each keyed set of elements 16, 20 is to be determined, can be used. The cover is rotated relative to its plate, with the sets of elements 16, 20 that are keyed cooperating with one another in such rotation. A lock cylinder, controlling tang 22*t*, is mounted on the peripheral wall for cover 11, with tang 22*t* rotatable into a suitable slot provided at a spot in plate 19 after ears and apertures are engaged. Thus, it will be seen also that the invention comprehends a shifting motion between key elements 16, 20 but which does not require a directing motion of the edge of a plate towards a lock means 22*t* to effect a lock mode. As here, lock means 22*t* is actuated after a cooperating set of elements 16, 20 are keyed but the circular plate's circumferential edge is not an essential feature in this embodiment of the invention.

FIGS. 1 and 2 show the keying elements 16, 20 to be located in columnar and row schemes, with omissions of locations in plate and cover for the disposition of such elements. Further, it is apparent that clip members with legs 37, 40 need not be introduced into all of the slots 38 shown in plate 19 in FIG. 2.

In the assembly of cover 11 to plate 19, cover 11 is set over plate 19 so that ears 16 are aligned with corresponding apertures 39 in their respective clip members. The cover 11 is caused to slide in the direction of arrow 68, FIG. 4, so that each ear 16 engages or projects through its corresponding aperture 39. After such engagement, key 46 is turned so that tang 22*t* rotates into abutment with edge 23 of plate 19. Key 46 is removed from its lock. Cover 11 can no longer be disengaged or disassembled from its plate 19.

In operation of the invention, cover 11 first is secured to the bottom of an article 14, by screws 50, FIGS. 2, 3. Screws 50 are connected through their corresponding holes 48 provided in topwall 12 of cover 11 to correspondingly located threaded holes 52 conventionally provided in the bottom of article 14. This connection is made from a position physically adjacent the underside of cover 11 and which is inaccessible when cover and plate are assembled. Plate 19 is secured to mounting surface 43, such as a desk top or work station surface, by screws 54, FIG. 2, being inserted through apertures 53 and into threaded holes 55 in mounting surface 43. Pad 42 may or may not be disposed (in its use) between plate 19 and mounting surface 43, but when used, preferably is attached to the bottom of plate 19 initially. And when including adhesive qualities, apertures 53 may or may not be utilized with pad 42. Thereafter, article 14 with its securely mounted cover 11 is set upon plate 19, plate 19 being encompassed thereby. Article 14 and cover 11 are caused to slide in a relative direction by which ears 16 move to engage and project through apertures 39 of means 20, FIG. 4. Key 46 is turned to cause abutment of tang 22*t* with edge 23 on plate 19, FIG. 4. Key 46 is removed from its cylinder lock 45, and article 14 now is protected from an unauthorized removal from mounting surface 43.

It now should be apparent that the boundaries of plate 19 need not specifically conform to the peripheral dimensions of cover 11 as long as means 16, 20 prevent relative shifting motion between cover and plate after they engage, and the spacing between the boundaries of plate 19 and periphery 15, along with the gap generated between periphery and mounting surface is such that means 16, 20 cannot be successfully attacked by a prying tool, regardless of whether or not a pad 42 is used.

Thus, as the depth of the cover's periphery need not necessarily extend to the plane of a mounting surface 43, with or without a pad 42 in use in practice of the invention, as long as plate 19 includes a rigidity throughout its dimensions, the keying members 16, 20 cannot be successfully attached as they cannot be approached through such a plate in its disposition in the manufacture 10. Nor do any differences in the adhesive qualities of a pad 42, should such a pad be used in the practice of the invention with or without apertures 53 in plate 19, provide for successful attach against keying members 16, 20, because of the rigidity and disposition of the plate. In other words, in comparison with a pad 42 having adhesive qualities, plate 19 is the significant element in effecting the desired deterrent against unauthorized removal of an article 14. For the reason that plate 19 isolates members 16, 20 from the cover's periphery. Too, keying members 16, 20 are arbitraily located throughout the expanse of the interior of the assembled cover and plate. Further, physical contact between the bottom of the cover's periphery and the mounting surface is not necessary in embodiments of the invention nor is such contact essential in our inventive concept, as the rigidity and extent of plate 19, with the indicated encompassing by the cover's periphery, prevent application of a cutting tool to keying members 16, 20 in any embodiment of the invention and successful attack on such keying members.

Plate 19 is preferably made of stainless steel. The fabrication of cover 11 and its ears 16 results from a die casting, a welded structure, a stamping, or a machined plate, and follows known techniques for fabrication. Aluminum of 380 grade is preferable in some instances of die casting. Cylinder lock 45 is of well known construction and availability in a number of makes and models. Each clip member is made of suitable metal and preferably is secured to the bottom side of plate 19, such as by spot welding, or with a plastic cement, cryanoacrylate. However, the body formation for apertures 39, and to which ears 16 are keyed by their horizontal sliding engagement therewith, may be formed directly out of the material of plate 19. Portions of plate 19 in its fabrication, can be appropriately blanked out, scored and broken, and then bent into a position duplicating that of the leg 37 of the clip member.

An advantage to an embodiment including separate clip members is that their number and placement to plate 19 can be made permanent or varied. Although cover 11 may include a greatest number of ears 16, less than a corresponding number of clip-members mounted to plate 19 may be utilized (and vice versa). Without accessiblity to within the confines of cover and plate, one does not know which ears and which clip-members, and their placements, are being utilized for a given manufacture.

This advantage is carried over to a plate out of which a plurality of means 20 can be formed, but not all of them at one time bent out of the plane of the plate. Selective ones of means 20 can be bent upwardly, and only the owner of apparatus 10 would know, as no one other than the owner would have access to the confines of cover and plate.

The invention also contemplates use of as great a practical number of elements 16 as possible on cover 11, and a lesser number of elements 20 mounted at randomly-selected locations on its corresponding plate 19, as well as great a practical number of elements 20 as possible on plate 19, with a lesser number of elements 16 mounted at randomly-selected locations on its corresponding cover 11. Again, only a purchaser of a given apparatus 10 will have knowledge of which elements 16, 20 are keyed to one another for latching such members together.

The invention is not limited to the unidirectional ears being directed to an edge 23 in which lock means 22ris mounted. Such keying members 16 may be directed in another direction than towards the edge in which lock means 22ris mounted, as indicated above.

Industrial Applicability

The invention is applicable to any article and/or equipment item desired to be protected from theft or unauthorized removable. Items such as computers, copiers, postage meters, electronic paper shredders, typewriters, and oscilloscopes are examples of protectible items, and use of the invention is not limited thereto. The invention even is capable of hanging on a wall to protect wall clocks and art work. Grandfather clocks, statues, sculpturing works of art are other examples of which the invention may be put to use.

We claim:

1. A manufacture adapted to secure an article to a mounting surface and comprising a cover having a topwall with an underside and a periphery joining said topwall, no more than one rigid plate substantially co-extensive in area with said cover and adapted for securement to the mounting surface, the cover encompassing said plate in assembly, means for connecting said cover to the article only from a position physically adjacent to the underside of said cover and being accessible thereto only when said cover and plate are disassembled, keying members respectively securely mounted on said plate and on the underside of said cover for corresponding cooperative engagement upon relative horizontal shifting motion between plate and cover in their assembly to one another, and lock means mounted to said periphery and abutting the plate to prevent relative horizontal shifting motion between plate and cover after such cooperative engagement, said lock means not being operatively connected to said keying members, such cooperative engagement and lock means preventing successful attack on said keying members.

2. The manufacture of claim 1 including an edge on said plate, said lock means abutting said edge after relative horizontal shifting motion between said cover and plate cooperatively engages said keying members to one another.

3. The manufacture of claim 2 wherein one of said keying members has at least one ear depending from the underside of said cover and the other of said keying members has at least one clip member including an aperture, said clip member secured to and extending upwardly from said plate and in alignment with such ear, said ear and aperture cooperatively engaging each other in such relative horizontal shifting motion.

4. The manufacture of claim 1 wherein one of said keying members has at least one ear depending from the underside of said cover and the other of said keying members has at least one clip member including an aperture secured to and extending upwardly from said plate and in alignment with such ear, said ear and aperture cooperatively engaging each other in such relative horizontal shifting motion.

5. The manufacture of claim 1 or claim 2 or claim 3 or claim 4 wherein said lock means comprises a cylinder secured in said periphery and having a tang thereon abuttable with said plate thereby preventing such relative horizontal shifting motion.

6. The manufacture of claim 5 including case hardened sleeves mounted on said connecting means above said cover for preventing separation of article from cover.

7. The manufacture of claim 1 or claim 2 or claim 3 or claim 4 including case hardened sleeves mounted on said connecting means above said cover for preventing separation of article from cover.

8. The manufacture of claim 1 wherein said lock means comprises a cylinder having a tang mounted thereon for rotation, said manufacture including a body segment comprising an edge on said plate physically adjacent said tang, at least one recess along said edge further defining said body segment, and a tab mounted on the end of said tang for rotation through said one recess to beneath the plate as said tang abuts said edge in such rotation.

9. The manufacture of claim 2 or claim 3 or claim 4 wherein said lock means comprises a cylinder having a tang mounted thereon for rotation, said manufacture including a body segment comprising an edge on said plate physically adjacent said tang, at least one recess along said edge further defining said body segment, and a tab mounted on the end of said tang for rotation through said one recess to beneath the plate as said tang abuts said edge in such rotation.

10. The manufacture of claim 5 including a body segment comprising an edge on said plate plysically adjacent said tang, at least one recess along said edge further defining said body segment, and a tab mounted on the end of said tang for rotation through said one recess to beneath the plate as said tang abuts said edge in such rotation.

11. The manufacture of claim 6 including a body segment comprising an edge on said plate physically adjacent said tang, at least one recess along said edge further defining said body segment, and a tab mounted on the end of said tang for rotation through said one recess to beneath the plate as said tang abuts said edge in such rotation.

12. The manufacture of claim 7 including a body segment comprising an edge on said plate physically adjacent said tang, at least one recess along said edge further defining said body segment, and a tab mounted on the end of said tang for rotation through said one recess to beneath the plate as said tang abuts said edge in such rotation.

13. The manufacture of claim 1 or claim 2 or claim 3 or claim 4 or claim 8 wherein said keying members are located on their respective cover and plate elements so as to form a randomly-selected pattern.

14. The manufacture of claim 5 wherein said keying members are located on their respective cover and plate elements so as to form a randomly-selected pattern.

15. The manufacture of claim 6 wherein said keying members are located on their respective cover and plate elements so as to form a randomly-selected pattern.

16. The manufacture of claim 7 wherein said keying members are located on their respective cover and plate elements so as to form a randomly-selected pattern.

17. The manufacture of claim 9 wherein said keying members are located on their respective cover and plate elements so as to form a randomly-selected pattern.

18. The manufacture of claim 10 wherein said keying members are located on their respective cover and plate elements so as to form a randomly-selected pattern.

19. The manufacture of claim 11 wherein said keying members are located on their respective cover and plate elements so as to form a randomly-selected pattern.

20. The manufacture of claim 12 wherein said keying members in their locations form a randomly-selected pattern.

21. The manufacture of claim 1 or claim 2 or claim 3 or claim 4 or claim 8 including means for securing said plate to the mounting surface.

22. The manufacture of claim 1 or claim 2 or claim 3 or claim 4 or claim 8 wherein the periphery of said cover has a depth which extends to the mounting surface when mounted thereto.

23. The manufacture of claim 21 wherein said securing means comprises a pad having adhesive qualities on each of its sides, one of such sides adhering to the bottom of said plate, its other side adapted to adhere to the mounting surface.

24. In an aperture for securing an article to a mounting surface and which includes a rigid plate adapted for securement to the mounting surface and a cover having a periphery and top with an underside, the cover connectable to the article only from a position physically adjacent ther underside of such cover and being accessible thereto only when the plate and cover are disassembled, the cover encompassing said rigid plate in assembly, the improvement comprising said plate being no more than one single member and being substantially co-extensive in area with said cover, keying members respectively securely mounted on said plate and on the underside of said cover for corresponding cooperative engagement upon relative horizontal shifting between plate and cover in their assembly to one another, and lock means mounted to said periphery abutting the plate and not operatively connected to said keying members to prevent horizontal shifting motion between said cover and plate after such cooperative engagement, the encompassing of cover to plate preventing successful attack on said keying members.

25. In the apparatus of claim 24, said keying members forming a randomly-selected pattern in their corresponding locations on said cover and plate.

26. The improvement of claim 24 or claim 25 including means for securing said plate to the mounting surface.

27. The improvement of claim 26 wherein said securing means comprises a pad having adhesive qualities on each of its sides, one of such sides adhering to the bottom of said plate, its other side adapted to adhere to the mounting surface.

28. The improvement of claim 26 wherein said securing means comprises holes in said plate.

29. The apparatus of claim 24 wherein the cover's periphery includes a depth which extends to physically engage the mounting surface.

* * * * *

UNITED STATES PATENT AND TRADEMARK OFFICE
CERTIFICATE OF CORRECTION

PATENT NO. : 4,739,637

DATED : April 26, 1988

INVENTOR(S) : A. MILTON FINKEL et al

It is certified that error appears in the above-identified patent and that said Letters Patent is hereby corrected as shown below:

In col. 11, line 26, "aperture" should be read as --apparatus--.

In col. 11, line 31, "ther" should be read as --the--.

In col. 12, claim 29 should be read as:

--In the apparatus of claim 24 the cover's periphery including a depth which extends to physically engage the mounting surface.--

Signed and Sealed this

Twenty-seventh Day of September, 1988

*Attest:*

DONALD J. QUIGG

*Attesting Officer*

*Commissioner of Patents and Trademarks*